(12) United States Patent
Kumon et al.

(10) Patent No.: US 10,343,607 B2
(45) Date of Patent: Jul. 9, 2019

(54) VIEWING DEVICE FOR VEHICLE

(71) Applicant: TOYOTA JIDOSHA KABUSHIKI KAISHA, Toyota-shi, Aichi-ken (JP)

(72) Inventors: Hitoshi Kumon, Aichi-gun (JP); Yasunobu Takahashi, Kyoto (JP); Yuto Ohtsuka, Kyoto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/884,679

(22) Filed: Jan. 31, 2018

(65) Prior Publication Data

US 2018/0272937 A1    Sep. 27, 2018

(30) Foreign Application Priority Data

Mar. 24, 2017 (JP) ................. 2017-060180

(51) Int. Cl.
| | |
|---|---|
| *B60R 1/00* | (2006.01) |
| *H04N 5/247* | (2006.01) |
| *G06T 11/60* | (2006.01) |
| *B60R 1/04* | (2006.01) |
| *B60R 1/12* | (2006.01) |

(52) U.S. Cl.
CPC ................. *B60R 1/00* (2013.01); *B60R 1/04* (2013.01); *B60R 1/12* (2013.01); *G06T 11/60* (2013.01); *H04N 5/247* (2013.01); *B60R 2001/1253* (2013.01); *B60R 2300/102* (2013.01); *B60R 2300/105* (2013.01); *B60R 2300/207* (2013.01); *B60R 2300/304* (2013.01); *B60R 2300/8006* (2013.01); *B60R 2300/8046* (2013.01)

(58) Field of Classification Search
CPC .... B60R 1/00; B60R 1/04; B60R 1/12; B60R 2300/105; B60R 2300/8046; B60R 2300/304; B60R 2300/8006; B60R 2300/207; B60R 2001/1253; B60R 2300/102; H04N 5/247; G06T 11/60
See application file for complete search history.

(56) References Cited

U.S. PATENT DOCUMENTS

| | | | | |
|---|---|---|---|---|
| 5,511,842 | A * | 4/1996 | Dillon | B60N 2/24 224/400 |
| 6,501,387 | B2 * | 12/2002 | Skiver | B60R 1/12 340/815.4 |
| 6,690,268 | B2 * | 2/2004 | Schofield | B60C 23/00 340/438 |
| 6,911,997 | B1 * | 6/2005 | Okamoto | B60R 1/00 348/148 |

(Continued)

FOREIGN PATENT DOCUMENTS

| | | |
|---|---|---|
| DE | 20 2014 102 291 U1 | 8/2014 |
| JP | 2011-135253 A | 7/2011 |

(Continued)

*Primary Examiner* — Sathyanaraya V Perungavoor
*Assistant Examiner* — Philip P. Dang
(74) *Attorney, Agent, or Firm* — Oliff PLC

(57) ABSTRACT

A viewing device for a vehicle, comprises: a plurality of imaging apparatuses that differ in imaging range; an image generation apparatus that, on the basis of images imaged by one or a plurality of the imaging apparatuses, generates a viewing image that is a composite of: an image to a vehicle rear, an image of a vehicle structure, the image being semi-transparent, and an image of a vehicle occupant on a rear seat; and a displayer that displays the viewing image.

3 Claims, 10 Drawing Sheets

(56) References Cited

U.S. PATENT DOCUMENTS

| | | | | | |
|---|---|---|---|---|---|
| 7,266,219 | B2* | 9/2007 | Okamoto | ............... | B60R 1/00 340/901 |
| 7,359,782 | B2* | 4/2008 | Breed | ............... | B60R 21/0134 180/274 |
| 7,407,029 | B2* | 8/2008 | Breed | ............... | B60N 2/002 180/274 |
| 7,415,126 | B2* | 8/2008 | Breed | ............... | B60J 10/00 382/100 |
| 7,493,844 | B2* | 2/2009 | Martin | ............... | F41H 5/0407 89/36.01 |
| 7,630,806 | B2* | 12/2009 | Breed | ............... | B60R 21/0134 180/273 |
| 7,663,502 | B2* | 2/2010 | Breed | ............... | B60C 11/24 340/12.25 |
| 7,783,403 | B2* | 8/2010 | Breed | ............... | B60R 21/0134 340/435 |
| 8,174,576 | B2* | 5/2012 | Akatsuka | ............... | G01S 17/023 348/118 |
| 2005/0002545 | A1* | 1/2005 | Yasui | ............... | B60R 1/00 382/104 |
| 2011/0025489 | A1* | 2/2011 | Shimoda | ............... | B60R 1/00 340/459 |
| 2011/0025848 | A1* | 2/2011 | Yumiba | ............... | B60R 1/00 348/148 |
| 2012/0257058 | A1* | 10/2012 | Kinoshita | ............... | G06T 3/0012 348/148 |
| 2014/0340516 | A1* | 11/2014 | Vojtisek | ............... | B60R 1/00 348/148 |
| 2016/0137126 | A1* | 5/2016 | Fursich | ............... | B60R 1/00 348/38 |
| 2016/0182823 | A1* | 6/2016 | Murasumi | ............... | B60R 1/00 348/38 |
| 2016/0272118 | A1* | 9/2016 | Kim | ............... | B60R 1/00 |

FOREIGN PATENT DOCUMENTS

| | | |
|---|---|---|
| JP | 2013-141120 A | 7/2013 |
| JP | 2014-199546 A | 10/2014 |

* cited by examiner

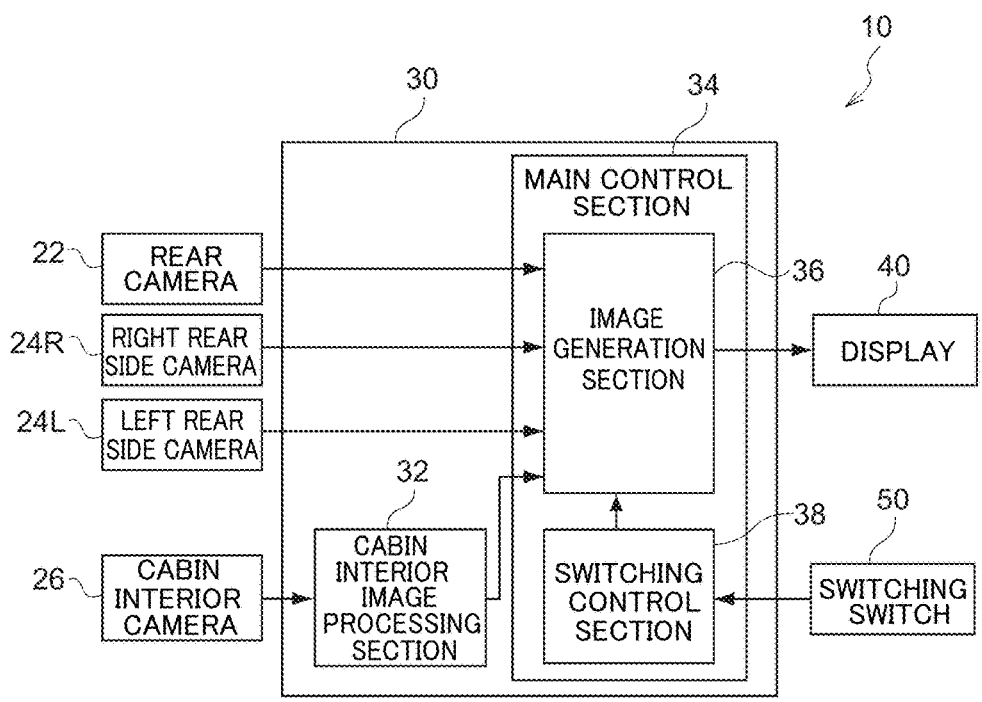

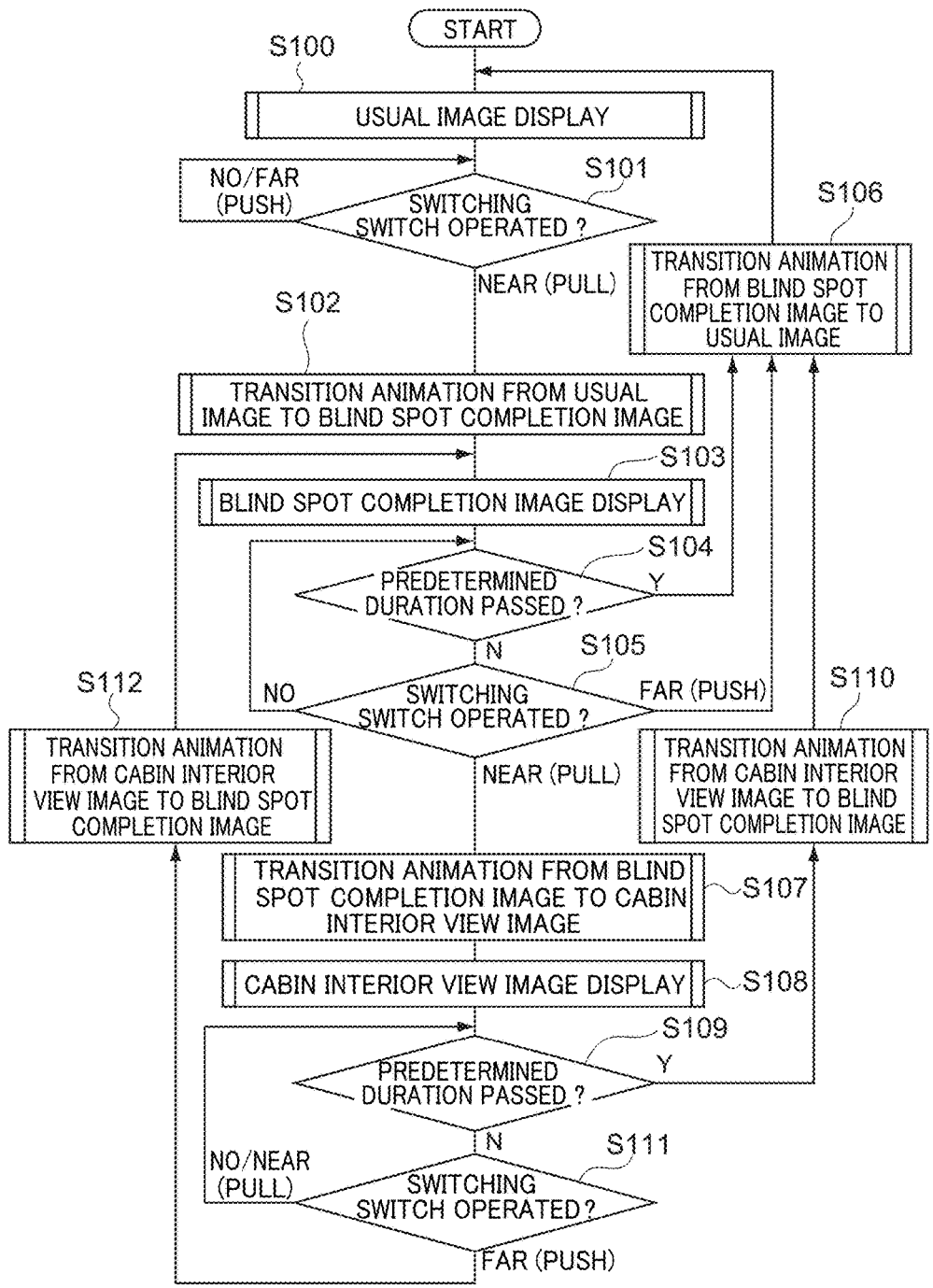

VIEWING DEVICE FOR VEHICLE

CROSS-REFERENCE TO RELATED APPLICATION

This application is based on and claims priority under 35 USC 119 from Japanese Patent Application No. 2017-060180 filed on Mar. 24, 2017, the disclosure of which is incorporated by reference herein.

BACKGROUND

Technical Field

Preferred embodiments relate to a viewing device for a vehicle that displays captured images in which vehicle surroundings are imaged.

Related Art

Japanese Patent Application Laid-Open (JP-A) No. 2013-141120 discloses an image display device (known as an electronic mirror) equipped with a rear camera that images to the rear of a vehicle and a rear side left camera and rear side right camera that image to the sides of the rear of the vehicle. In this image display device, an image imaged by the rear camera is composited with images imaged by the rear side left camera and the rear side right camera to generate a continuous rear image. Thus, objects disposed to the rear of the vehicle can be displayed.

JP-A No. 2014-199546 discloses a driving assistance device that composites an image of vehicle surroundings imaged from an upper portion of the vehicle with a vehicle cabin interior image imaged from an upper portion of the vehicle cabin interior and displays the composite image at a displayer.

However, although the image display device of JP-A No. 2013-141120 has the advantage of providing a view spanning rear surroundings in a wide-angle rear image composited from the plural cameras without obstruction by rear seat vehicle occupants, vehicle structures and the like, differences from the display of a conventional optical inner mirror (below referred to simply as an optical mirror) may cause a feeling of strangeness.

In particular, because a vehicle occupant on a rear seat and vehicle structures are not displayed by this image display device, conditions to the rear of the vehicle, conditions inside the vehicle cabin and such may not be understood.

With the driving assistance device of JP-A No. 2014-199546, conditions of vehicle surroundings and the vehicle cabin interior may be understood. However, because the images that are viewed look down from the vehicle upper portion, the vehicle rear may not be seen with a similar feeling to a conventional optical mirror.

SUMMARY OF INVENTION

In consideration of the above circumstances, exemplary embodiments provide a viewing device for a vehicle that may moderate a feeling of strangeness during viewing and that enables understanding of conditions at the vehicle rear and inside the vehicle cabin.

A viewing device for a vehicle according to a first aspect includes: plural imaging apparatuses that differ in imaging range; an image generation apparatus that, on the basis of images imaged by one or a plural number of the imaging apparatuses, generates a viewing image that is a composite of: an image to a vehicle rear, an image of a vehicle structure, the image being semi-transparent, and an image of a vehicle occupant on a rear seat; and a displayer that displays the viewing image.

The viewing device for a vehicle according to the first aspect is provided with the plural imaging apparatuses with different imaging ranges. A viewing image generated on the basis of images imaged by one or a plural number of the imaging apparatuses is displayed at the displayer. This viewing image is generated by compositing an image to the vehicle rear with an image of a vehicle structure and an image of a vehicle occupant on a rear seat. Here, the meaning of the term "vehicle structure" includes, for example, structural objects such as pillars, a roof and so forth. In the viewing device for a vehicle described above, the image of the vehicle structure is composited in a semi-transparent state. The composited viewing image is displayed at the displayer and is viewed by a driver.

According to the viewing device for a vehicle of the first aspect, a viewing image in which blind spots are removed as in an electronic mirror, a viewing image with a viewing angle close to that of a conventional optical mirror, and the like may be provided. The vehicle structure that is made semi-transparent and the vehicle occupant on the rear seat can be displayed in these viewing images. Consequently, the feeling of strangeness of an electronic mirror for a driver who is familiar with optical mirrors may be moderated, and conditions at the vehicle rear and inside the vehicle cabin may be understood. Because the vehicle occupant on the rear seat is made visible, the condition of the vehicle occupant may be checked and communication may be facilitated.

In the viewing device for a vehicle according to a second aspect, the image generation apparatus generates the viewing image such that a level of transparency of the vehicle structure increases toward the vehicle upper side.

According to the viewing device for a vehicle of the second aspect, because the level of transparency increases upward away from the vehicle body, objects in the vehicle surroundings can be easily viewed even while the feeling of strangeness associated with an electronic mirror is moderated.

In the viewing device for a vehicle according to a third aspect, the plurality of imaging apparatuses that are provided include: a rear camera that images rearward from a vehicle rear portion, a rear side camera that images rearward from a vehicle side portion, and a cabin interior camera that images rearward in a vehicle cabin, including imaging a rear seat, and the image generation apparatus composites: the image to the vehicle rear, in which an image imaged by the rear camera and an image imaged by the rear side camera are composited, the image of the vehicle structure, which originates from the cabin interior camera, and the image of the vehicle occupant on the rear seat, which originates from the cabin interior camera.

According to the viewing device for a vehicle of the third aspect, both blind spots may be removed and a vehicle occupant on a rear seat may be viewed by the plural imaging apparatuses provided in the vehicle.

According to preferred embodiments, a feeling of strangeness during viewing may be moderated, and conditions to the vehicle rear and inside the vehicle cabin may be understood.

BRIEF DESCRIPTION OF THE DRAWINGS

Exemplary embodiments will be described in detail based on the following figures, wherein:

FIG. 3 is a block diagram showing schematic structures of the viewing device for a vehicle according to the first exemplary embodiment.

FIG. 7 is a flowchart showing switching processing and image generation processing of the viewing device for a vehicle according to the first exemplary embodiment.

DETAILED DESCRIPTION

First Exemplary Embodiment

Figure 1:
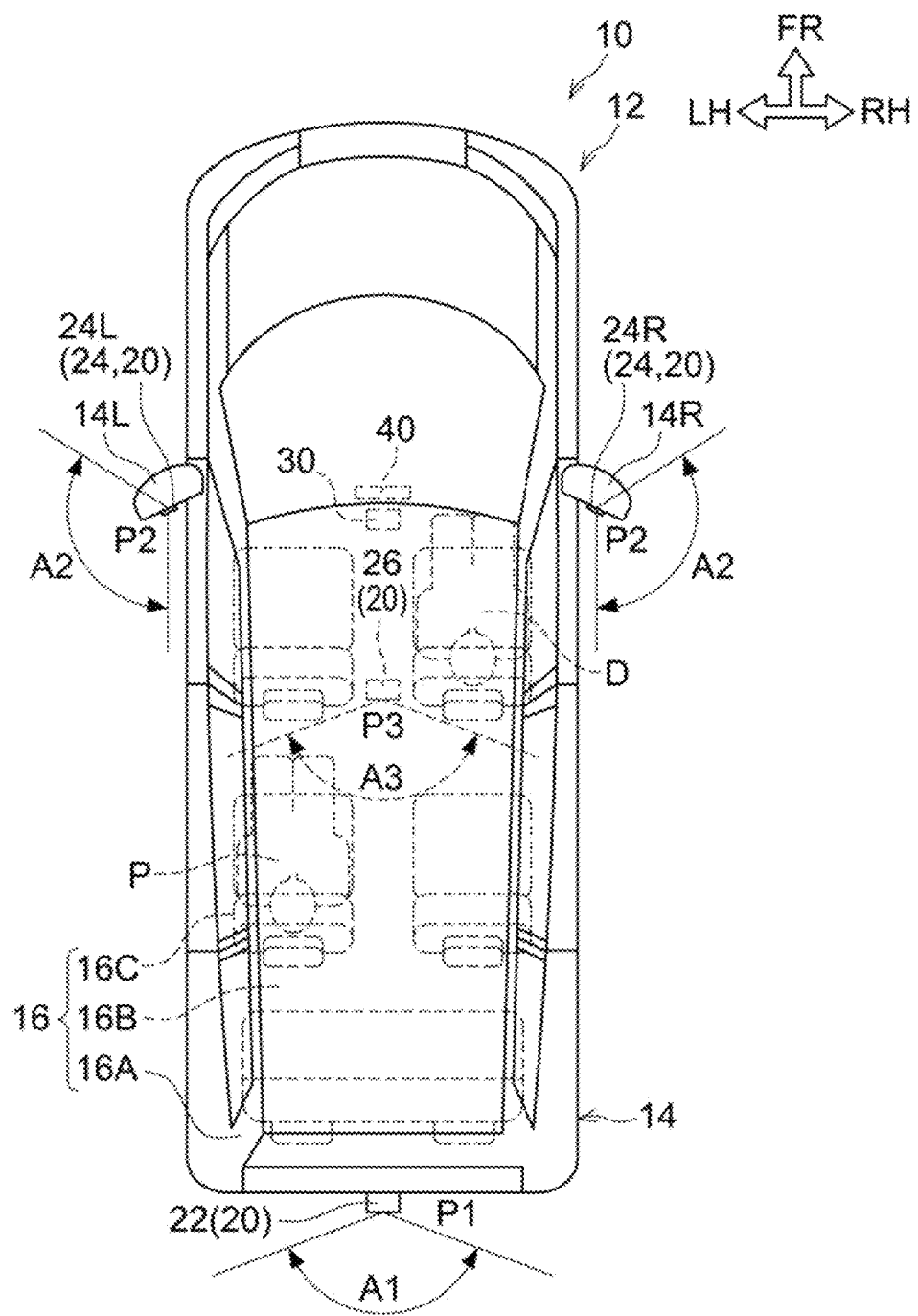
FIG. 1 is a diagram schematically showing vehicle mounting positions of a viewing device for a vehicle according to a first exemplary embodiment.

Herebelow, a first exemplary embodiment is described in detail with reference to the attached drawings. FIG. 1 is a diagram showing a vehicle 12 in which a viewing device for a vehicle 10 according to the present exemplary embodiment is employed. The vehicle 12 according to the present exemplary embodiment is a vehicle in which three rows of seats are arranged in the vehicle front-and-rear direction, such as a minivan, a people-mover or the like. Note, however, that FIG. 1 and FIG. 4A to FIG. 6C show an example in which a driver D is seated and in which a passenger P is seated at the left side of rear seats 16C (in the second row).

Structures

Figure 2:
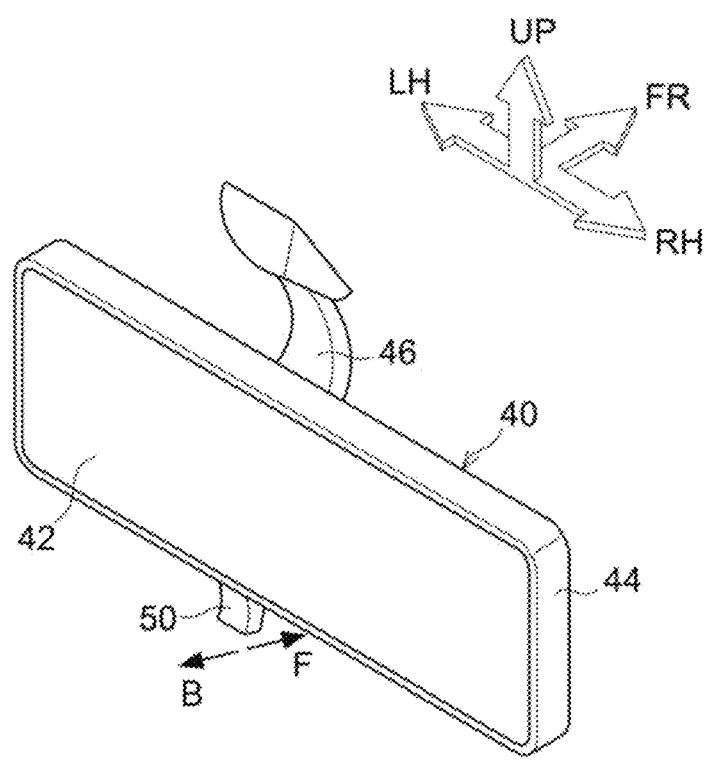
FIG. 2 is a perspective view showing a display and switching switch of the viewing device for a vehicle according to the first exemplary embodiment.

As shown in FIG. 1 to FIG. 3, the viewing device for a vehicle 10 according to the present exemplary embodiment includes plural cameras 20, a display 40, a switching switch 50 and a control device 30. These structures are described below.

The viewing device for a vehicle 10 according to the present exemplary embodiment is equipped with the plural cameras 20, which are imaging apparatuses with different imaging ranges relative to the vehicle 12. As shown in FIG. 1, the cameras 20 according to the present exemplary embodiment include a rear camera 22, rear side cameras 24 (a right rear side camera 24R and a left rear side camera 24L), and a cabin interior camera 26.

The rear camera 22 is provided at the vehicle width direction middle of a rear portion of the vehicle 12. For example, if the vehicle 12 is a sedan car, the rear camera 22 is disposed at an upper end of a luggage door or over a rear number plate, and if the vehicle 12 is a vehicle with a rear gate, the rear camera 22 is disposed at an upper portion of the rear gate, or the like. The rear camera 22 is a wide-angle camera that can image a wide range to the rear from close to the rear end of the vehicle. The rear camera 22 has a disposition and imaging angle similar to common previously known reversing monitor cameras. A disposition point P1 of the rear camera 22 according to the present exemplary embodiment is above the rear number plate, and an imaging angle A1 of the rear camera 22 is set to at least a range spanning the vehicle rear. If the imaging angle A1 is wider than needed, it is sufficient to crop a range required for generation of a viewing image from the imaging range. Thus, in a vehicle equipped with a reversing monitor, the reversing monitor may also be used as the rear camera 22, and if there is a difference in the imaging range, the imaging range may be cropped to a required range.

The rear side cameras 24 include the right rear side camera 24R and the left rear side camera 24L, disposition points P2 of which are at outer mirrors 14R and 14L at both ends of the vehicle width direction. Specifically, the rear side cameras 24 according to the present exemplary embodiment are each attached in a state in which a lens inside a wind cover provided at a lower portion of the outer mirror 14R or 14L is oriented rearward. An imaging angle A2 of each rear side camera 24 is set to at least a range spanning the vehicle width direction outer side and vehicle rear relative to a vehicle body 14. If the imaging angle A2 is wider than needed, it is sufficient to crop a range required for generation of a viewing image from the imaging range.

The rear side cameras 24 may be disposed independently instead of at the outer mirrors 14R and 14L. In this case, each rear side camera 24 may also be used as a camera for an "electronic outer mirror". That is, an image imaged by the rear side camera 24 is displayed at a dedicated display, which is not shown in the drawings, provided at a front pillar lower portion, an instrument panel, a door trim or the like. Furthermore, rather than protrusions being provided at the sides of the vehicle body 14 of the vehicle 12, fisheye cameras provided in general surfaces of the vehicle body 14 at both sides of the vehicle width direction may serve as the rear side cameras 24. Rear side images may be cropped from images imaged by the fisheye cameras.

A disposition point P3 of the cabin interior camera 26 is a location with a view spanning the rear seats 16C, at a surface at the vehicle width direction middle of the vehicle lower side of a roof trim, which is not shown in the drawings. An imaging angle A3 of the cabin interior camera 26 is set to at least a range spanning the rear seats 16C. If the imaging angle A3 is wider than needed, it is sufficient to crop a range required for generation of a viewing image from the imaging range. It is sufficient that the cabin interior camera 26 has a view spanning the rear including the rear seats 16C; the cabin interior camera 26 may be provided, for example, in the vicinity of a stay of an existing optical mirror, near the vehicle width direction middle of a vicinity of the head of a front seat passenger, or the like.

The viewing device for a vehicle 10 according to the present exemplary embodiment is provided with a liquid crystal-type display 40 serving as a displayer that displays viewing images, described below, which are generated on the basis of images imaged by one or a plural number of the cameras 20. As shown in FIG. 2, the display 40 includes a liquid crystal panel 42 and a main body portion 44 that supports the liquid crystal panel 42. The display 40 according to the present exemplary embodiment is provided to serve as an "electronic mirror" that replaces a previous optical mirror, in which the mirror surface itself is replaced with the liquid crystal panel 42. An arm 46 of the display 40 extends from an upper portion of the main body portion 44. The display 40 is supported by the arm 46 being fixed to a roof header console, a front windshield or the like. Although the display 40 according to the present exemplary embodiment is a liquid crystal display, this is not limiting. For example, an organic light-emitting diode-type (OLED) display, a display equipped with a projector and a screen, or the like may be used.

As alternatives to the above, the display 40 may be disposed at a roof header console, a lower portion vicinity of the middle of a front windshield (an upper portion of the middle of an instrument panel), or the like. Furthermore, the display 40 may be combined with an existing navigation display in the vicinity of the front windshield. A disposition location of the display 40 is not necessarily limited to a vehicle width direction middle vicinity but may be in the vicinity of dials in front of the driver or an upper portion thereof, or in the vicinity of a sun visor. The display 40 may also be a distant display in the form of a "head-up display" in which reflection at the front windshield, a dedicated combiner (reflecting plate) or the like is used as a projection method. However, in terms of familiarity with a conventional optical mirror, disposition in a region close to a location at which the conventional mirror would be disposed is desirable.

The switching switch 50 is provided at a lower portion of the main body portion 44 of the display 40, which is at the vehicle width direction left-and-right middle. The switching switch 50 serves as an operation component for switching between plural viewing images, which are described below. The switching switch 50 is provided in a region corresponding to a lever for switching glare prevention of a conventional optical mirror. The switching switch 50 according to the present exemplary embodiment can be operated in the front-and-rear direction; it is desirable to employ a momentary toggle switch that returns to a neutral position when released from a hand.

Now, a control system of the viewing device for a vehicle 10 according to the present exemplary embodiment is described.

As shown in FIG. 3, the control system according to the present exemplary embodiment is principally structured by the control device 30. The control device 30 is provided at, for example, a floor vicinity at the front seat side of the vehicle 12 (see FIG. 1). The control device 30 includes a CPU, ROM and RAM. The rear camera 22, the right rear side camera 24R, the left rear side camera 24L, the cabin interior camera 26, the display 40 and the switching switch 50 are connected to the control device 30. The control device 30 is principally divided into a cabin interior image processing section 32 and a main control section 34. The main control section 34 executes viewing image generation processing, switching processing and such. The main control section 34 includes an image generation section 36 and a switching control section 38.

The cabin interior image processing section 32 is provided to serve as a unit that executes processing for extracting images of vehicle structures 16, a passenger P on the rear seats 16C and so forth. To be specific, an image imaged by the cabin interior camera 26 is inputted into the cabin interior image processing section 32, and the cabin interior image processing section 32 executes processing to extract images of the vehicle structures 16 and the passenger P on the rear seats 16C, which are cabin interior images, from the image imaged by the cabin interior camera 26. The vehicle structures 16 according to the present exemplary embodiment include pillars 16A, a roof 16B, the rear seats 16C (the second row), seats in the third row, and so forth. In other words, the vehicle structures 16 according to the present exemplary embodiment correspond to structures of the vehicle that would be shown in a previous optical mirror.

The vehicle structures 16 are basically in a fixed pattern. Accordingly, the cabin interior image processing section 32 according to the present exemplary embodiment separates out the vehicle structures 16 and the passenger P on the basis of differences between image frames, or image patterns when the passenger P is not present that have been imaged beforehand, or distance differences according to focusing differences, and the like. For window areas (side windows) in images imaged by the cabin interior camera 26, the cabin interior image processing section 32 may separate out scenery outside the vehicle (outside the windows) as seen from inside on the basis of fixed patterns, similarly to the vehicle structures 16. That is, scenery outside the vehicle (outside the windows) as seen from inside the vehicle is depicted overlaid with images imaged by the rear camera 22, the right rear side camera 24R and the left rear side camera 24L, and it is deleted in advance by processing of the cabin interior image processing section 32.

The image information of the vehicle structures 16 and image information of the passenger P on the rear seats 16C that have been extracted by the cabin interior image processing section 32 are outputted to the image generation section 36 of the main control section 34, which is described below. The cabin interior image processing section 32 according to the present exemplary embodiment is provided separately from the image generation section 36 in the control device 30, but this is not limiting; the cabin interior image processing section 32 may be incorporated in the image generation section 36. Further, the functions of the cabin interior image processing section 32 may be provided to embedded software (firmware) in the cabin interior camera 26; that is, the functions of the cabin interior image processing section 32 may be embedded in the cabin interior camera 26.

The image generation section 36 is provided to serve as an image generation apparatus that generates plural viewing images, which differ in one or both of viewpoint and viewing angle, on the basis of images imaged by one or a plural number of the cameras 20. To be specific, images imaged by the rear camera 22, the right rear side camera 24R, the left rear side camera 24L and the cabin interior camera 26 are inputted into the image generation section 36. As to images imaged by the cabin interior camera 26, the image information of the vehicle structures 16 and image information of the passenger P on the rear seats 16C that have been extracted by the cabin interior image processing section 32 as described above are inputted. As shown in FIG. 4A to FIG. 4C and FIG. 5A to FIG. 5C, as the viewing images, a usual image, a blind spot completion image and a cabin interior view image can be generated.

Figure 4A:
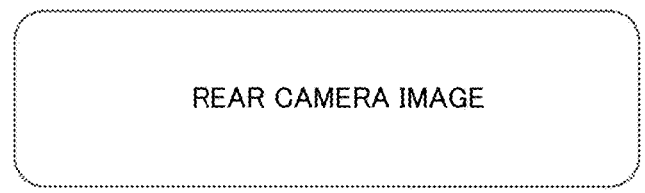
FIG. 4A is a view showing a usual image generated by cameras of the viewing device for a vehicle according to the first exemplary embodiment.
Figure 5A:
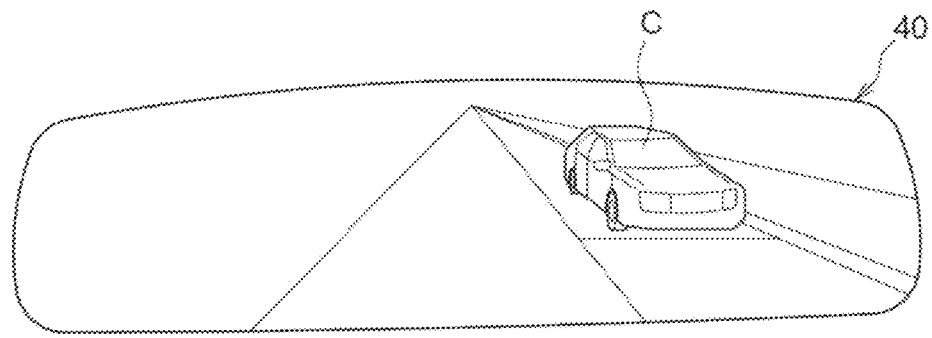
FIG. 5A is a view showing the usual image displayed at the display of the viewing device for a vehicle according to the first exemplary embodiment.
Figure 6A:
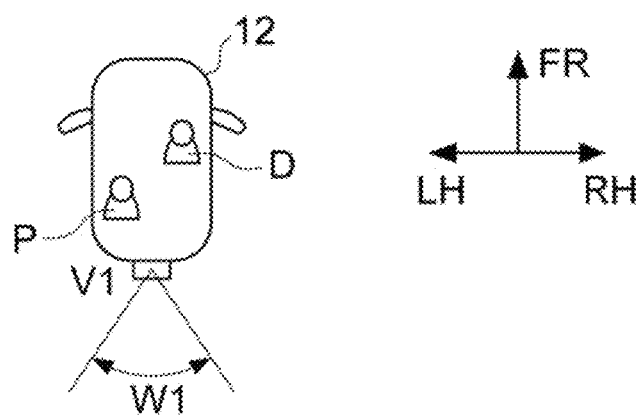
FIG. 6A is a diagram describing the usual image of the viewing device for a vehicle according to the first exemplary embodiment.

First, the image generation section 36 generates a usual image as illustrated in FIG. 5A on the basis of an image imaged by the rear camera 22. As illustrated in FIG. 4A, this usual image is the unaltered image imaged by the rear camera 22 or is an ordinary electronic mirror display trimmed to an imaging range that is suitable during running. As illustrated in FIG. 6A, the usual image has a virtual viewpoint V1 at the rear end of the vehicle body 14 and a virtual viewing angle W1 with a range spanning the rear of the vehicle 12. In the example in FIG. 5A, a vehicle C is displayed running along an adjacent lane at the rear of the vehicle (the vehicle 12).

Figure 4B:
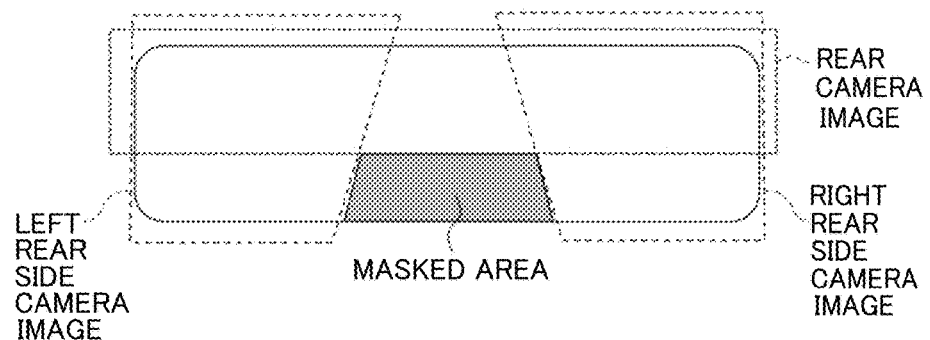
FIG. 4B is a view showing a blind spot completion image that is formed on the basis of the usual image of FIG. 4A.
Figure 5B:
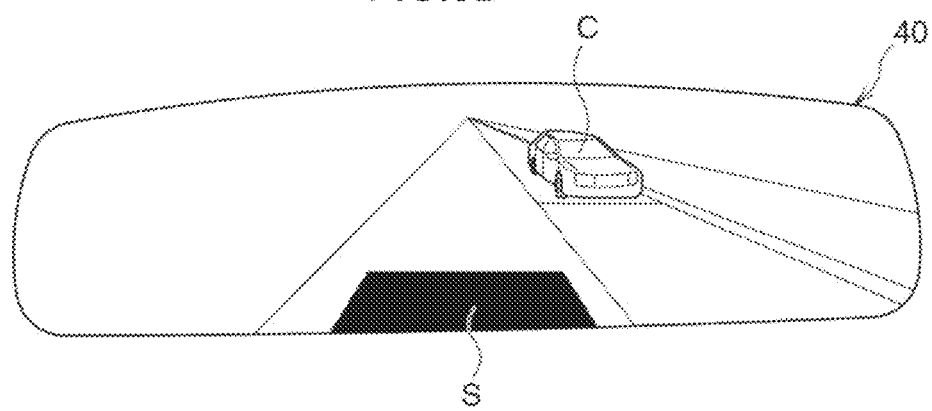
FIG. 5B is a view showing the blind spot completion image displayed at the display of the viewing device for a vehicle according to the first exemplary embodiment.
Figure 6B:
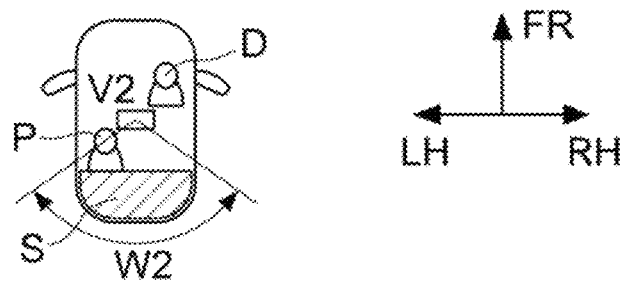
FIG. 6B is a diagram describing the blind spot completion image of the viewing device for a vehicle according to the first exemplary embodiment.

The image generation section 36 also generates a blind spot completion image as illustrated in FIG. 5B on the basis of images imaged by the rear camera 22 and the rear side cameras 24. As illustrated in FIG. 4B, the blind spot completion image uses images from the images imaged by the right rear side camera 24R and the left rear side camera 24L in addition to the image imaged by the rear camera 22, transforming and compositing the three images into a continuously joined wide-angle image. In the descriptions below, a transformed and composited image of images imaged by the rear camera 22 and the left and right rear side cameras 24 is referred to as a "rear composite image". As illustrated in FIG. 6B, the blind spot completion image has a virtual viewpoint V2 close to the vehicle front-and-rear middle of the vehicle 12, and a virtual viewing angle W2 with a range spanning the rear and the sides of the vehicle 12. In the blind spot completion image, the virtual viewpoint is moved forward and the virtual viewing angle is widened relative to the usual image. In the example in FIG. 4B, the vehicle C running along the adjacent lane is displayed at the rear of the vehicle (the vehicle 12), and sides of the rear of the vehicle 12, which are not displayed in the usual image, are displayed. In the blind spot completion image, a portion of the vehicle 12 that would be present in the range viewed from the virtual viewpoint V2 is displayed as a masked area S. This masked area S is formed by a range of the vehicle 12 projected onto a road surface being shaded out to appear like a shadow. The range of the masked area S is actually a region that cannot be seen, corresponding to beneath the vehicle 12, and does not enter any imaging angles A1 and A2 of each of the three cameras 20. The purpose of the appearance in which the masked area S is shaded out is to correct for a region that cannot be seen and make the images consistent with each other. In addition, because a range of the road surface occupied by the vehicle is displayed on the screen, there is an effect in that relationships with surrounding vehicles can be easily understood.

Figure 4C:
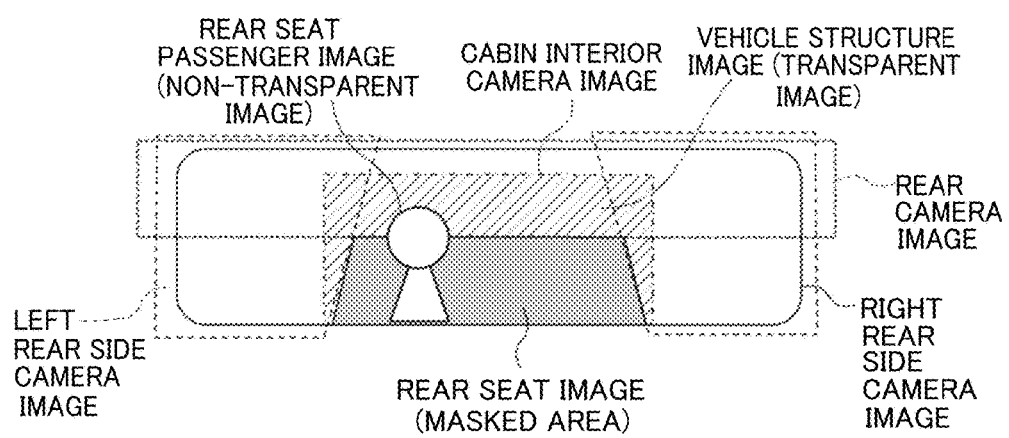
FIG. 4C is a view showing a composite state of a cabin interior view image that is formed on the basis of FIG. 4B.
Figure 5C:
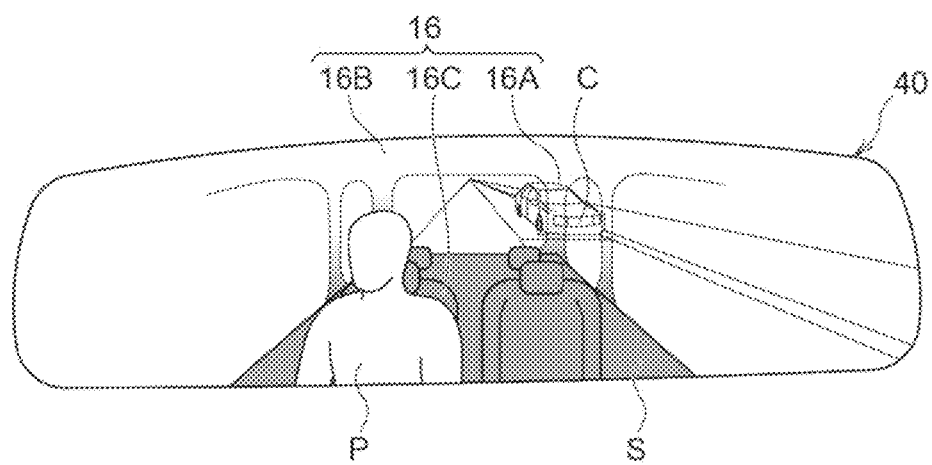
FIG. 5C is a view showing the cabin interior view image displayed at the display of the viewing device for a vehicle according to the first exemplary embodiment.
Figure 6C:
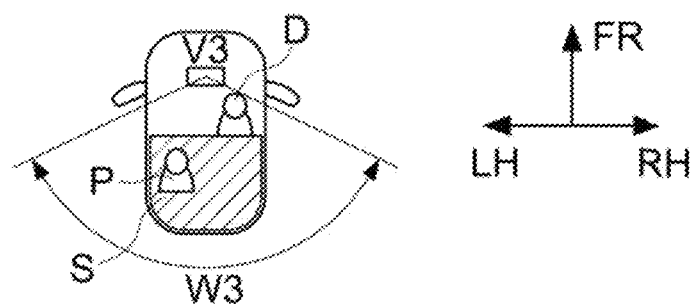
FIG. 6C is a diagram describing a virtual viewing angle and virtual viewpoint of the cabin interior view image of the viewing device for a vehicle according to the first exemplary embodiment.

Further, the image generation section 36 generates a cabin interior view image as illustrated in FIG. 5C on the basis of images imaged by the rear camera 22, the rear side cameras 24 and the cabin interior camera 26. As illustrated in FIG. 4C, this cabin interior view image composites the image imaged by the cabin interior camera 26 in addition to the rear composite image. As illustrated in FIG. 6C, the cabin interior view image has a virtual viewpoint V3 close to the location of disposition of the display 40, and a virtual viewing angle W3 with a range of viewing across the passenger P on the rear seats 16C and the rear and sides of the vehicle 12. In the cabin interior view image, the virtual viewpoint is moved further toward the front and the virtual viewing angle is widened relative to the blind spot completion image. Therefore, in the cabin interior view image, the display range of the rear composite image based on the rear camera 22, the right rear side camera 24R and the left rear side camera 24L is expanded compared to the rear composite image in the blind spot completion image. Accordingly, the masked area S in the cabin interior view image is larger than in the blind spot completion image, and images of the surroundings are moved further to the outer sides of the image.

The passenger P on the rear seats 16C and the vehicle structures 16 appear in the image imaged by the cabin interior camera 26. However, as described above, the passenger P on the rear seats 16C and the vehicle structures 16 are processed to be separated out from surrounding images by the cabin interior image processing section 32 in advance. The image generation section 36 composites images of the vehicle structures 16 and an image of the passenger P on the rear seats 16C, which have been separated out by the cabin interior image processing section 32, with the rear composite image based on the images imaged by the rear camera 22, the right rear side camera 24R and the left rear side camera 24L. Specifically, the image generation section 36 composites the masked area S that is enlarged compared to the blind spot completion image with the images of the vehicle structures 16 in regions surrounding the masked area S, and then composites the image of the passenger P on the rear seats 16C, who is at the near side relative to the vehicle structures 16.

For the cabin interior view image, the image generation section 36 generates a viewing image in which the images of the vehicle structures 16 are made semi-transparent. This is done with a view to not completely masking regions that coincide with the vehicle structures 16 in the rear composite image based on the rear camera 22, the right rear side camera 24R and the left rear side camera 24L. The level of transparency of the vehicle structures 16 is increased toward the vehicle upper side. The closer to the vehicle upper side, the greater the transparency, which is to say, the more clearly the rear of the vehicle 12 is displayed. The style of transparency of the vehicle structures 16 is not limited thus. The transparency may be uniform, and the level of transparency may be arbitrarily adjusted from complete masking to complete transparency.

Moreover, the image generation section 36 generates a viewing image in which the passenger P on the rear seats 16C is composited. This image of the passenger P on the rear seats 16C is composited in a non-transparent state. In the example in FIG. 5C, the rear seats 16C and the passenger P seated on the rear seats 16C are displayed to be non-transparent, portions of the pillars 16A, which are the vehicle structures 16, are made transparent, and the roof 16B is displayed in a completely transparent state. Therefore, the vehicle C running along the adjacent lane at the rear of the vehicle (the vehicle 12) is visibly displayed even when it overlaps with the pillars 16A.

The switching control section 38 is provided to serve as a switching unit that is capable of switching a viewing image displayed at the display 40 to an alternative viewing image. On the basis of signals when the switching switch 50 is operated, the switching control section 38 according to the present exemplary embodiment executes switching processing to command the image generation section 36 to generate a new viewing image.

For example, if the switching switch 50 is operated toward the side thereof at which the driver D is disposed (the side of arrow B in FIG. 2), the switching control section 38 switches to a viewing image whose virtual viewpoint is closer to the vehicle front or to a viewing image whose virtual viewing angle is wider. To be specific, when the viewing image is the usual image, the switching control section 38 switches to the blind spot completion image, and when the viewing image is the blind spot completion image, the switching control section 38 switches to the cabin interior view image. If the viewing image is the cabin interior view image, the switching control section 38 maintains the cabin interior view image; that is, the operation of the switching switch 50 is cancelled. Because the display 40 equipped with the switching switch 50 is in front of the driver D, the switching switch 50 being operated toward the side at which the driver D is disposed means the switching switch 50 being operated to a near side from the driver D's perspective (the arrow B side in FIG. 2). The switching control section 38 according to the present embodiment is configured such that if the switching switch 50 is operated toward the near side when the viewing image is the cabin interior view image, the input of signals from the switching switch 50 is disregarded, but a cancellation method is not limited thus. For example, the switching control section 38 may be configured such that the input of signals is prohibited when the switching switch 50 is operated toward the near side while the viewing image is the cabin interior view image.

As a further example, if the switching switch 50 is operated toward the opposite side from the side thereof at which the driver D is disposed, that is, a far side from the driver D's perspective (the arrow F side in FIG. 2), the switching control section 38 switches to a viewing image whose virtual viewpoint is closer to the vehicle rear or to a viewing image whose virtual viewing angle is narrower. Specifically, when the viewing image is the cabin interior view image, the switching control section 38 switches to the blind spot completion image, and when the viewing image is the blind spot completion image, the switching control section 38 switches to the usual image. If the viewing image is the usual image, the switching control section 38 maintains the usual image; that is, the operation of the switching switch 50 is cancelled. The switching control section 38 according to the present embodiment is configured such that if the switching switch 50 is operated toward the far side when the viewing image is the usual image, the input of signals from the switching switch 50 is disregarded, but the cancellation method is not limited thus. For example, the switching control section 38 may be configured such that the input of signals is prohibited when the switching switch 50 is operated toward the far side while the viewing image is the usual image.

The switching control section 38 according to the present exemplary embodiment is configured so as to return to the usual image if a predetermined duration passes with a viewing image other the usual image. That is, if a predetermined duration passes with the blind spot completion image, the switching control section 38 switches to the usual image, and if a predetermined duration passes with the cabin interior view image, the switching control section 38 switches to the blind spot completion image and then switches to the usual image.

Switching Processing and Image Generation Processing

Switching processing that is executed by the switching control section 38 and image generation processing that is executed by the image generation section 36 are described using the flowchart of FIG. 7.

When the ignition of the vehicle 12 is turned on, the viewing device for a vehicle 10 starts up. In step S100, the image generation section 36 generates a usual image and displays the usual image at the display 40. The main control section 34 then proceeds to step S101.

In step S101, the switching control section 38 makes a determination as to an operation state of the switching switch 50. If it is determined that the switching switch 50 is being operated (pulled) to the near side toward the driver D (the arrow B side in FIG. 2), the main control section 34 proceeds to step S102. When the switching switch 50 is being operated to the near side, the switching control section 38 commands the image generation section 36 to switch from the usual image to the blind spot completion image. On the other hand, if it is determined that the switching switch 50 is not being operated or if it is determined that the switching switch 50 is being operated (pushed) to the far side away from the driver D (the arrow F side in FIG. 2), the main control section 34 executes step S101 again. That is, step S101 is repeated and the state in which the usual image is displayed continues until the switching switch 50 is operated to the near side toward the driver D.

In step S102, the image generation section 36 generates a transition animation image sequence from the usual image to the blind spot completion image, and the transition animation is displayed at the display 40. In the transition animation, the display is zoomed out, changing the virtual viewing angle of the viewing image progressively from W1 to W2, and the display slides, changing the virtual viewpoint progressively from V1 to V2. Then, the main control section 34 proceeds to step S103.

In step S103, after the transition animation has completed, the image generation section 36 generates the blind spot completion image in which the virtual viewing angle is fixed at W2 and the virtual viewpoint is fixed at V2, and displays the blind spot completion image at the display 40. Then, the main control section 34 proceeds to step S104.

In step S104, the main control section 34 makes a determination as to whether a predetermined duration has passed. This predetermined duration is a time that has passed since the viewing image was switched. As an example, the duration is set to 30 seconds in the present exemplary embodiment. If it is determined that the predetermined duration has not yet passed, the main control section 34 proceeds to step S105. On the other hand, if it is determined that the predetermined duration has passed, the main control section 34 proceeds to step S106.

In step S105, the switching control section 38 makes a determination as to the operation state of the switching switch 50. If it is determined that the switching switch 50 is being operated (pushed) to the far side away from the driver D (the arrow F side in FIG. 2), the main control section 34 proceeds to step S106. If it is determined that the switching switch 50 is being operated (pulled) to the near side toward the driver D (the arrow B side in FIG. 2), the main control section 34 proceeds to step S107. If it is determined that the switching switch 50 is not being operated, the main control section 34 returns to step S104. When the switching switch 50 is operated toward the far side or the near side, the switching control section 38 commands the image generation section 36 to switch the viewing image from the blind spot completion image to a viewing image according to the direction in which the switching switch 50 is being operated.

The main control section 34 proceeds to step S106 if it is determined in step S104 that the predetermined duration has passed or if it is determined in step S105 that the switching switch 50 is being operated toward the far side (the arrow F side in FIG. 2). In step S106, the image generation section 36 generates a transition animation image sequence from the blind spot completion image to the usual image, and the transition animation is displayed at the display 40. In this transition animation, the display is zoomed in, changing the virtual viewing angle of the viewing image progressively from W2 to W1, and the display slides, changing the virtual viewpoint progressively from V2 to V1. Then, the main control section 34 returns to step S100.

Alternatively, if it is determined in step S105 that the switching switch 50 is being operated toward the near side (the arrow B side in FIG. 2), then in step S107 the image generation section 36 generates a transition animation image sequence from the blind spot completion image to the cabin interior view image, and the transition animation is displayed at the display 40. In this transition animation, the display is zoomed out, changing the virtual viewing angle of the viewing image progressively from W2 to W3, and the display slides, changing the virtual viewpoint progressively from V2 to V3. In addition, in this transition animation, cabin interior images are faded into the display. Then, the main control section 34 proceeds to step S108.

In step S108, after the transition animation has completed, the image generation section 36 generates the cabin interior view image in which the virtual viewing angle is fixed at W3 and the virtual viewpoint is fixed at V3, and displays the cabin interior view image at the display 40. Then, the main control section 34 proceeds to step S109.

In step S109, the main control section 34 makes a determination as to whether a predetermined duration has passed. This predetermined duration is a time that has passed since the viewing image was switched as described above. If it is determined that the predetermined duration has not yet passed, the main control section 34 proceeds to step S111. On the other hand, if it is determined that the predetermined duration has passed, the main control section 34 proceeds to step S110.

In step S110, the image generation section 36 generates a transition animation image sequence from the cabin interior view image to the blind spot completion image, and the transition animation is displayed at the display 40. In this transition animation, the display is zoomed in, changing the virtual viewing angle of the viewing image progressively from W3 to W2, and the display slides, changing the virtual viewpoint progressively from V3 to V2. In addition, in this transition animation, the cabin interior images are faded out of the display. Then, the main control section 34 proceeds to step S106. That is, after the predetermined duration has passed from the display of the cabin interior view image, a progressive transition animation is implemented that progresses from the cabin interior view image to the usual image. Thereafter, the main control section 34 returns to step S100 and the usual image is displayed at the display 40.

If it is determined in step S109 that the predetermined duration has not passed, then in step S111 the switching control section 38 makes a determination as to the operation state of the switching switch 50. If it is determined that the switching switch 50 is being operated (pushed) to the far side away from the driver D (the arrow F side in FIG. 2), the main control section 34 proceeds to step S112. When the switching switch 50 is operated toward the far side, the switching control section 38 commands the image generation section 36 to switch the viewing image from the cabin interior view image to the blind spot completion image. Alternatively, if it is determined that the switching switch 50 is not being operated or it is determined that the switching switch 50 is being operated (pulled) to the near side toward the driver D (the arrow B side in FIG. 2), the main control section 34 returns to step S109.

In step S112, the image generation section 36 generates a transition animation image sequence from the cabin interior view image to the blind spot completion image, and the transition animation is displayed at the display 40. In this transition animation, the display is zoomed in, changing the virtual viewing angle of the viewing image progressively from W3 to W2, and the display slides, changing the virtual viewpoint progressively from V3 to V2. In addition, in this transition animation, the cabin interior images are faded out of the display. Then, the main control section 34 returns to step S103. Thus, after the transition animation has completed, the image generation section 36 generates the blind spot completion image in which the virtual viewing angle is fixed at W2 and the virtual viewpoint is fixed at V2, and displays the blind spot completion image at the display 40.

The switching processing executed by the switching control section 38 and the image generation processing executed by the image generation section 36 as described above continue to be executed until the ignition is turned off.

The Transition Animations

Figure 8:
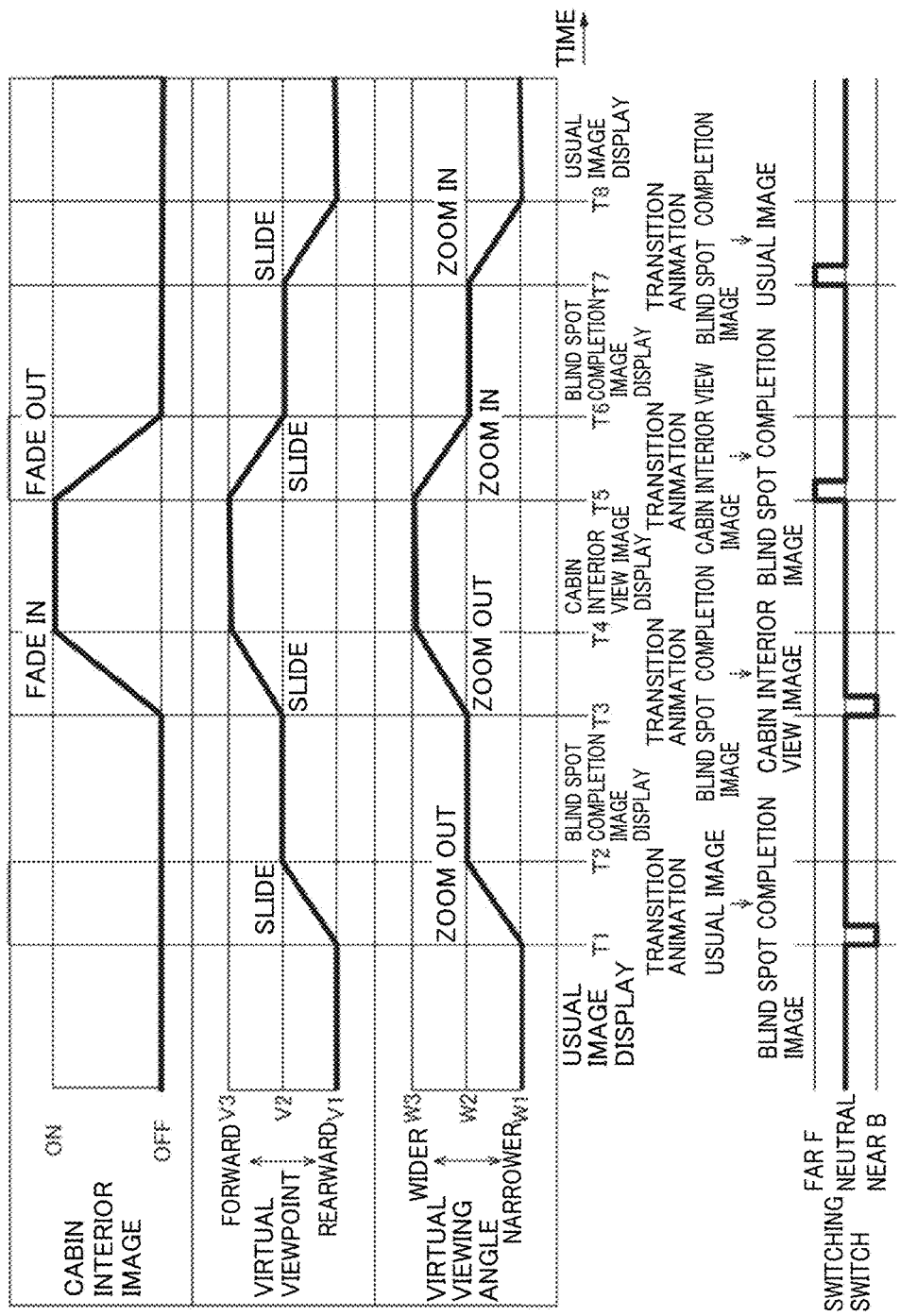
FIG. 8 is a timing chart of the switching processing of the viewing device for a vehicle according to the first exemplary embodiment.
Figure 9:
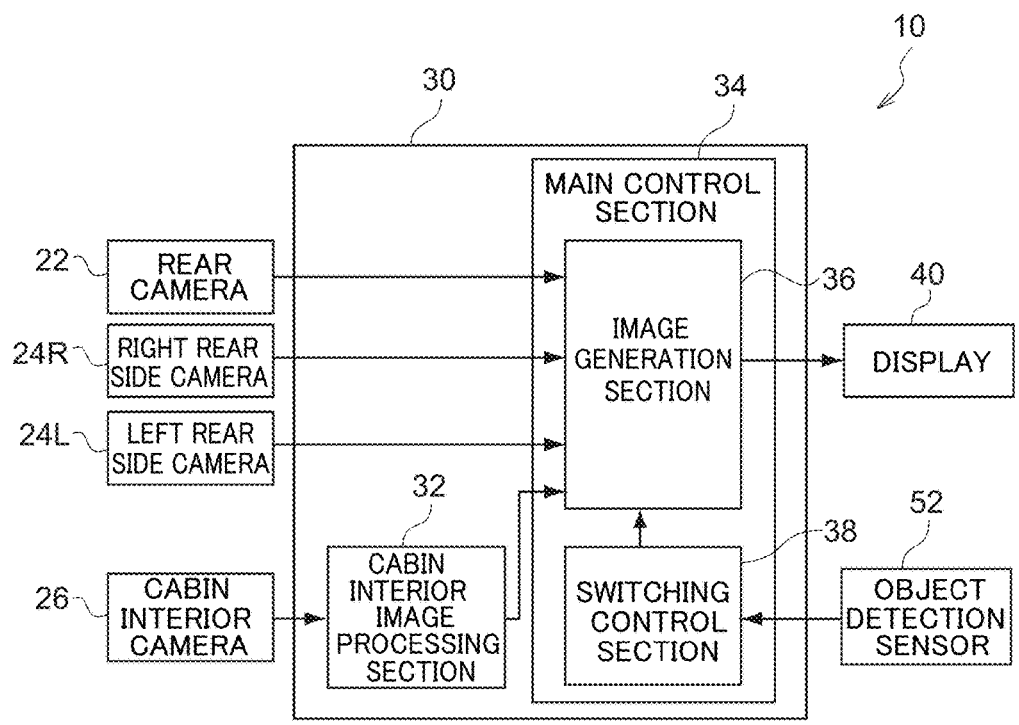
FIG. 9 is a block diagram showing schematic structures of a viewing device for a vehicle according to a second exemplary embodiment.
Figure 10:
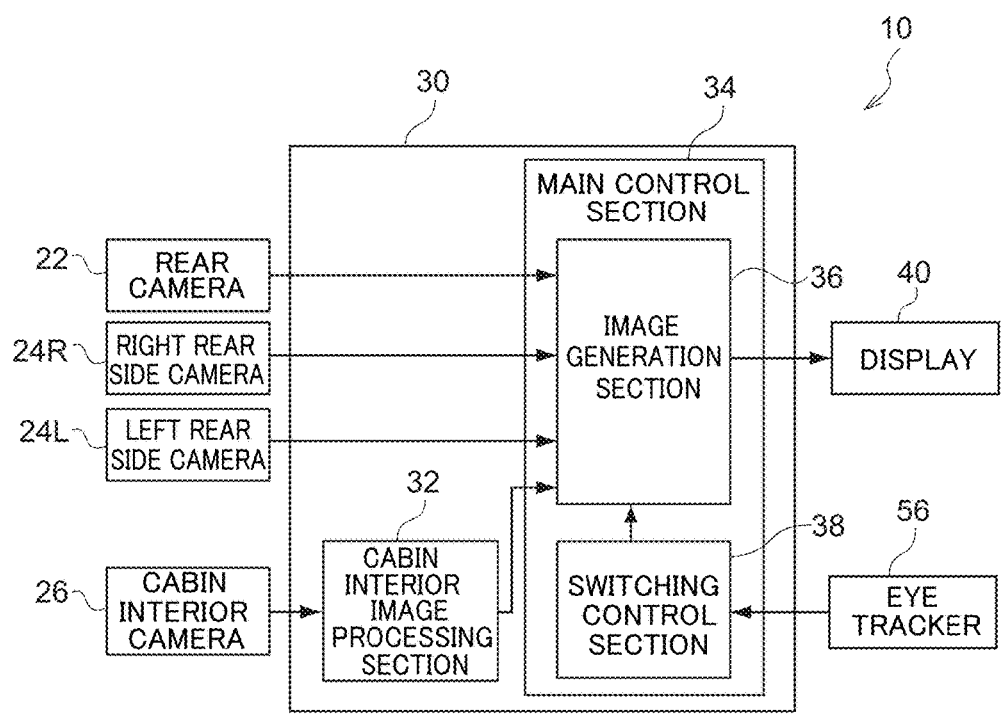
FIG. 10 is a block diagram showing schematic structures of a viewing device for a vehicle according to a third exemplary embodiment.

Changing states of images when the transition animations are executed are described using the timing chart shown in FIG. 8. In FIG. 8, as an example, the viewing image is changed in sequence from the usual image to the blind spot completion image and then the cabin interior view image, and then changed back to the viewing image via the blind spot completion image.

First, from a state in which the usual image is displayed at the display 40 as illustrated in FIG. 5A, when a command to switch to the blind spot completion image is received from the switching control section 38 at time T1, the viewing image changes as follows. From time T1 to time T2, the transition animation from the usual image to the blind spot completion image is executed. More specifically, the image generation section 36 generates a transition animation image sequence and displays the transition animation at the display 40. In this transition animation, the display is zoomed out, changing the virtual viewing angle of the viewing image progressively from W1 to W2, and the display slides, changing the virtual viewpoint progressively from V1 to V2. During this, rear composite images are generated such that imaged objects are continuous in ranges of overlapping between images imaged by the rear camera 22 and images imaged by the rear side cameras 24 (see FIG. 4B). In addition, a range that is not imaged by the rear camera 22 and the rear side cameras 24, that is, a range of the vehicle 12 projected onto the road surface, is generated in a shaded state as the masked area S (see FIG. 4B and FIG. 5B).

Then, from the state in which the blind spot completion image is displayed at the display 40 as illustrated in FIG. 5B, when a command to switch to the cabin interior view image is received from the switching control section 38 at time T3, the viewing image changes as follows. From time T3 to time T4, the transition animation from the blind spot completion image to the cabin interior view image is executed. More specifically, the image generation section 36 generates a transition animation image sequence and displays the transition animation at the display 40. In this transition animation, the display is zoomed out, changing the virtual viewing angle of the viewing image progressively from W2 to W3, and the display slides, changing the virtual viewpoint progressively from V2 to V3. During this, in rear composite images based on images imaged by the rear camera 22 and images imaged by the rear side cameras 24, the display range is reduced and the size of the masked area S is enlarged correspondingly (see FIG. 4C).

In the cabin interior view image, the masked area S that has expanded as described above and cabin interior images that are images of the vehicle structures 16 in the surroundings of the masked area S are faded in. At the same time, an image of a passenger P that is a cabin interior image vehicle structure is faded in at the near side relative to the images of the vehicle structures 16, in a non-transparent state. The images of the vehicle structures 16 that are displayed in the surroundings of the masked area S are processed to be semi-transparent. These semi-transparent images of the vehicle structures 16 are specified such that the level of transparency increases toward the vehicle upper side. Images of the vehicle structures 16 displayed in the masked area S may be semi-transparent or may be non-transparent.

Then, from the state in which the cabin interior view image is displayed at the display 40 as illustrated in FIG. 5C, when a command to switch to the blind spot completion image is received from the switching control section 38 at time T5, the viewing image changes as follows. From time T5 to time T6, the transition animation from the cabin interior view image to the blind spot completion image is executed. More specifically, the image generation section 36 generates a transition animation image sequence and displays the transition animation at the display 40. In this transition animation, the display is zoomed in, changing the virtual viewing angle of the viewing image progressively from W3 to W2, and the display slides, changing the virtual viewpoint progressively from V3 to V2. During this, in rear composite images based on images imaged by the rear camera 22 and images imaged by the rear side cameras 24, the display range is enlarged and the size of the masked area S is reduced correspondingly (see FIG. 4B).

The masked area S and cabin interior images displayed in the surroundings of the masked area S in the cabin interior view image are faded out (see FIG. 5B).

Then, from the state in which the blind spot completion image is displayed at the display 40 as illustrated in FIG. 5B, when a command to switch to the usual image is received from the switching control section 38 at time T7, the viewing image changes as follows. From time T7 to time T8, the transition animation from the blind spot completion image to the usual image is executed. More specifically, the image generation section 36 generates a transition animation image sequence and displays the transition animation at the display 40. In this transition animation, the display is zoomed in, changing the virtual viewing angle of the viewing image progressively from W2 to W1, and the display slides, changing the virtual viewpoint progressively from V2 to V1. Images imaged by the rear side camera 24 are removed; finally, only images imaged by the rear camera 22 are used. Correspondingly, the masked area S is removed and the usual image is displayed (see FIG. 4A and FIG. 5A).

Summary of the First Exemplary Embodiment

Characteristics of the viewing device for a vehicle 10 according to the present exemplary embodiment are summarized below.

In the present exemplary embodiment, the plural cameras 20 with different imaging ranges are provided, and viewing images are generated and displayed at the display 40 on the basis of images imaged by one or a plural number of the cameras 20. Plural types of viewing image are provided, with respectively different viewpoints and imaging angles.

For example, in the present exemplary embodiment, three types of viewing image displaying the rear of the vehicle 12 are provided: the usual image, the blind spot completion image and the cabin interior view image. As illustrated in FIG. 6A to FIG. 6C, these viewing images are configured such that the virtual viewing angle widens as the virtual viewpoint moves toward the front.

The viewing images according to the present exemplary embodiment have the following characteristics. In the usual image, the field of view is not obstructed by a passenger P on the rear seats 16C or the vehicle structures 16, and the road surface directly behind the vehicle 12 is clearly displayed. Therefore, conditions to the rear are easy to view. In the blind spot completion image, blind spots that tend to occur at the rear left and right sides and objects close to the vehicle side vicinities may be shown in the manner of an image from a wide-angle camera looking through transparent bodies from a virtual viewpoint that is close to the middle of the vehicle. The cabin interior view image is displayed with a viewpoint and viewing angle very close to those of a previous optical mirror. When the cabin interior view image is selected, a feeling of strangeness caused by a difference in the imaging angle of an electronic mirror from an optical mirror may be suppressed, conditions of rear seat vehicle occupants may be checked, and the cabin interior view image may play a role in facilitating communication.

According to the viewing device for a vehicle 10 of the present exemplary embodiment, the viewing device for a vehicle 10 has the characteristic of being configured such that the switching control section 38 may switch between the plural viewing images. That is, according to the viewing device for a vehicle 10 of the present exemplary embodiment, the blind spot completion image in which blind spots are removed as in an electronic mirror and the cabin interior view image with a viewing angle close to that of a conventional optical mirror may be provided, in addition to which a driver may freely switch between these viewing images. Thus, the feeling of strangeness of an electronic mirror for a driver who is familiar with optical mirrors may be moderated, and the display range may be changed as required.

The image generation section 36 according to the present exemplary embodiment has the characteristic that, when the viewing image is switched, the image displayed at the display 40 is progressively changed from the viewing image preceding the switch to the viewing image succeeding the switch. To be specific, a transition animation is executed. Thus, the virtual viewing angle is shown zooming progressively and the virtual viewpoint is shown sliding progressively, and cabin interior images are faded in or faded out. Thus, according to the viewing device for a vehicle 10 of the present exemplary embodiment, because the image is changed progressively when the viewing image is being switched, a relationship between the viewing ranges of the viewing images before and after the switch can be easily understood. In particular, because the viewing angle always changes in an animation in the manner of a physical viewpoint being progressively changed, whichever viewing image a user switches to, the user can intuitively understand the display state without a feeling of strangeness, and conditions in the surroundings may be promptly understood.

In the transition animations of the present exemplary embodiment, all elements—the virtual viewing angle, the virtual viewpoint and the cabin interior images—are combined and are changed simultaneously. However, not necessarily all of these elements need be changed simultaneously.

Of the virtual viewing angle and the virtual viewpoint, priority is given to changing both, which is most effective. However, one may be fixed and only the other changed. For example, the virtual viewpoint may be fixed at the viewpoint V3 that is suitable for cabin interior view images while only the virtual viewing angle is changed, from W1 for the furthest viewing state through the intermediate angle W2 to the widest angle W3, as illustrated in FIG. 6A to FIG. 6C. This is equivalent to fixing the position of a camera and altering the f-number of a zoom lens. As a further example, the zoom (f-number) may be kept fixed at the viewing angle W3 that is suitable for cabin interior view images while only the virtual viewpoint is changed, from V1 corresponding to the vehicle rear end through the intermediate V2 to V3, which is furthest forward and is the state in which the rear seats 16C may be looked down on. This is equivalent to a camera with a wide-angle fixed focus lens being moved forward and rearward.

In the transition animations, although changing the elements simultaneously enables the significance of image changes to be intuitively understood in the shortest time, changing these elements simultaneously is not necessarily a limitation. For example, successive processing may be performed, in which one of a change in the virtual viewing angle and a change in the virtual viewpoint is implemented first and then the other follows. Further, in the transition animation from the blind spot completion image to the cabin interior view image, the changes in the virtual viewing angle and the virtual viewpoint may be simultaneously implemented first, and thereafter the cabin interior images may be composited. Conversely, the cabin interior images may be faded in first and then the changes in the virtual viewing angle and the virtual viewpoint implemented.

The animation effects may be replaced with effects with similar connotations. For example, in an animation that displays the cabin interior images, the fade-in may be replaced with an effect that similarly provides a gentle impression when the cabin interior images are being introduced into the image, such as a random stripe-in, a dissolve-in or the like.

The image generation section 36 according to the present exemplary embodiment has the characteristic of generating a viewing image in which semi-transparent images of the vehicle structures 16 are composited. To be specific, in the cabin interior view image, the vehicle structures 16 such as the pillars 16A and the roof 16B may be extracted from an image imaged by the cabin interior camera 26, and the vehicle structures 16 may be made transparent and composited with the rear composite image. In particular, by the vehicle structures 16 being displayed such that the level of transparency increases from the vehicle lower side toward the upper side, pillars extending from the lower side to the upper side of the vehicle body 14 may be depicted as if gradually vanishing.

Thus, according to the viewing device for a vehicle 10 of the present exemplary embodiment, even when the cabin interior view image that is a viewing image similar to a conventional optical mirror is displayed, the vehicle structures 16 that obstruct the field of view are made transparent. Therefore, objects in the vehicle surroundings may be easily viewed even while the feeling of strangeness associated with an electronic mirror is moderated. Thus, because images of vehicles in the surroundings may be seen with a feeling close to an optical mirror, the advantages of both an optical mirror and an electronic mirror in which there are few field of view obstacles due to semi-transparency processing of the vehicle structures 16 may be provided.

The image generation section 36 according to the present exemplary embodiment has the characteristic of generating viewing images in which an image of a passenger P on the rear seats 16C is composited. To be specific, in the cabin interior view image, a passenger P seated on the rear seats 16C may be extracted from an image imaged by the cabin interior camera 26, and the passenger P may be kept non-transparent and composited with the rear composite image.

Thus, according to the viewing device for a vehicle 10 of the present exemplary embodiment, because a passenger P sitting on the rear seats 16C may be viewed, the conditions of passengers may be checked. For example, the condition of a child seated on the rear seats 16C or seated on a child seat attached to the rear seats 16C may be checked. In addition, the viewing device for a vehicle 10 may facilitate communication. For example, during conversation with a passenger P on the rear seats 16C, even though it is difficult for the driver D to move their eyeline from forward because the driver D is driving, the driver D may check facial expressions of the passenger P on the rear seats 16C. Thus, the present exemplary embodiment may provide the functions of a "communication mirror" as well as the primary functions of an electronic mirror.

The viewing device for a vehicle 10 according to the present exemplary embodiment has the characteristics that the switching switch 50 that may be operated forward and rearward is provided at the main body portion 44 of the display 40, and that when the switching switch 50 is operated toward the side thereof at which the driver D is disposed, the switching control section 38 switches to a viewing image in which the virtual viewpoint is further forward in the vehicle or a viewing image with a wider virtual viewing angle.

In the present exemplary embodiment, the switching switch 50 being operated in the near direction toward the driver D is specified to change the viewing image from the usual image to the blind spot completion image or from the blind spot completion image to the cabin interior view image, that is, to change in the direction in which the virtual viewing angle is widened and the virtual viewpoint is moved forward. A reason for this is that when operation directions of the switching switch 50 and switching directions of the viewing image are experimentally evaluated, the result is that all of ten test participants find that changing the viewing image from the usual image to the blind spot completion image and from the blind spot completion image to the cabin interior view image when the switching switch 50 is operated to the near side is most intuitive. This matches the intuition of a driver because, when the driver notices a display object in the viewing image, changing the virtual viewing angle in the widening direction or the virtual viewpoint in the forward direction brings new objects into view in the image, which objects are closer in the vehicle forward direction. Thus, according to the present exemplary embodiment, a driver may switch the viewing image intuitively.

The way the switching switch 50 is operated is not limited to this direction. Making operation directions of the switching switch 50 match the directions in which the virtual viewpoint moves in the vehicle front-and-rear direction when attention is drawn to the front or rear of the virtual viewpoint relative to the vehicle 12 can be considered. That is, operation of the switching switch 50 to the far direction (the vehicle front) away from the driver D may be specified to change the viewing image from the usual image to the blind spot completion image and from the blind spot completion image to the cabin interior view image.

In the present exemplary embodiment, for reasons of ease of inputting signals and moving forward and rearward from any state, a momentary toggle switch that returns to a neutral position when released from a hand is employed. However, if a three-position fixing (locking) type switch is used, an advantage is provided in that the orientation of the switch matches the state of the image being displayed.

The switching switch 50 serving as the operation component is not limited to a toggle switch that is attached below the main body portion 44 of the display 40. For example, a mounting position is not limited to the vicinity of the display 40 and may be disposed at an instrument panel, a spoke of a steering wheel or the like. Furthermore, the type of switch is not limited to a toggle switch and may be, for example, a electrostatic touch sensor or the like that detects a position at which a finger is placed, a motion of a finger moving or the like, and switches accordingly. Furthermore, a graphical user interface (GUI) at the display 40 may be employed as the operation component.

Alternative positions of the switch may be specified in four steps, five steps or the like, implementing continuous zoom displays using intermediate states of the viewing images in the animations. An analog-type operation mode may be employed in which personally preferred positions are specified at locations spaced along a path of the switch.

Hereabove, the present exemplary embodiment assumes switching between three representative positions with respectively different advantages to intuitively suit the senses of a user who is a driver. However, there are not necessarily three positions. One position may be omitted to provide two positions, there may be multiple positions utilizing intermediate states between the three positions, continuous switching may be used, or the like.

Similarly to the cabin interior view image, the cabin interior images—images of the vehicle structures 16 and images of passengers P—may be composited in the blind spot completion image that is intermediate between the usual image and the cabin interior view image. That is, images with different size ratios between cabin interior regions and regions surrounding the vehicle 12 may be generated based on the cabin interior view image and the blind spot completion image.

The viewing device for a vehicle 10 according to the present exemplary embodiment is configured so as to display the usual image at the display 40 when the ignition is turned on when the vehicle is started up. It is desirable to reset and display the usual image each time the vehicle is started up. However, an alternative viewing image that is preferred by the driver may be set as an initial state, or a last mode may be employed in which the viewing image that was previously being used is retained.

In the present exemplary embodiment, as shown in FIG. 7, when a viewing image other than the usual image is left as is, the viewing image automatically returns to the usual image after a predetermined duration. However, this is not limiting. The display of the viewing image that has been switched to may be continued. This is equivalent to the predetermined durations in step S104 and step S109 of the flowchart in FIG. 7 being set to infinite values. It is also possible for a driver themself to customize and select an option for recovery from the last mode described above.

Second Exemplary Embodiment

In the viewing device for a vehicle 10 according to the first exemplary embodiment, the viewing image is switched in accordance with operations of the switching switch 50. In contrast, in the viewing device for a vehicle 10 according to a second exemplary embodiment, the switching control section 38 may switch the viewing image in accordance with information on objects that are present in the viewing ranges of the cameras 20. To be specific, in the present exemplary embodiment, an object detection sensor 52 is provided instead of the switching switch 50 according to the first exemplary embodiment, and signals from the object detection sensor 52 are inputted to the switching control section 38.

The object detection sensor 52 according to the present exemplary embodiment is a millimeter wave radar, an ultrasound sonar or the like, which may detect positions and movement speeds of objects such as vehicles, pedestrians, obstacles on the road and the like in the surroundings of the vehicle 12. The object detection sensor 52 is disposed at a rear bumper, a side door or the like. A detection range of the object detection sensor 52 is desirably within the viewing ranges of the rear camera 22 and the left and right rear side cameras 24.

In switching processing according to the present exemplary embodiment, when, for example, a motorbike approaches at the side of the vehicle 12 during display of the usual image and this approach is detected by the object detection sensor 52, the switching control section 38 switches the viewing image from the usual image to the blind spot completion image, and the image generation section 36 displays the motorbike that is at the side of the vehicle 12. As a further example, if another vehicle approaches from directly behind the vehicle 12 during display of the cabin interior view image and the object detection sensor 52 detects this approach, the switching control section 38 switches the viewing image from the cabin interior view image to the usual image, and the image generation section 36 displays an enlarged image of the vehicle rear from the rear camera 22.

According to the viewing device for a vehicle 10 of the present exemplary embodiment, in accordance with conditions in the surroundings of the vehicle 12, the viewing image may be automatically switched as appropriate to the conditions. In the present exemplary embodiment, proximity information on vehicles, pedestrians, obstacles on the road and the like serves as information to be used for switching of the viewing image, but this is not limiting. For example, the viewing image may be switched on the basis of sound information such as loud noises, voices and the like. If sound information is used for switching, for example, the viewing image may be switched from the usual image to the cabin interior view image when a child seated on the rear seats 16C cries.

Third Exemplary Embodiment

The viewing device for a vehicle 10 according to the first exemplary embodiment switches the viewing image in accordance with operations of the switching switch 50, and the viewing device for a vehicle 10 according to the second exemplary embodiment switches the viewing image in accordance with information from the object detection sensor 52. In contrast, in the viewing device for a vehicle 10 according to a third exemplary embodiment, the switching control section 38 may switch the viewing image in accordance with the eyeline of a driver D. To be specific, in the present exemplary embodiment, an eye tracker 56 is provided instead of the switching switch 50 of the first exemplary embodiment, and signals from the eye tracker 56 are inputted to the switching control section 38.

The eye tracker 56 according to the present exemplary embodiment is configured to be able to detect the eyeline direction of the driver D from turning movements of the pupils and changes in reflectance of the cornea.

In switching processing according to the present exemplary embodiment, for example, if it is determined by the eye tracker 56 during display of the usual image that the eyeline is directed to the side of the display 40, the switching control section 38 switches the viewing image from the usual image to the blind spot completion image. Thus, the image generation section 36 displays a range at which the eyeline is directed relative to the usual image. As a further example, if it is determined by the eye tracker 56 during display of the blind spot completion image that attention is being paid to the masked area S, the switching control section 38 switches the viewing image from the blind spot completion image to the cabin interior view image. Thus, the image generation section 36 displays an enlarged display of the rear seats 16C.

According to the viewing device for a vehicle 10 of the present exemplary embodiment, the viewing image may be automatically switched to optimally display an object the driver D is watching. Further, the viewing image may be switched when a particular region within the display 40 is being watched. Further still, the viewing image may be switched when deliberate blinking or the like is detected.

Supplementary Descriptions

Exemplary embodiments are described hereabove, but preferred embodiments may be embodied by combinations of the first to third exemplary embodiments. Thus, the switching control section 38 may be connected to the object detection sensor 52 and eye tracker 56 or the like as well as to the switching switch 50, and the viewing image may be switched with these sensors being selected as appropriate.

As a variant example of the cameras 20 of the exemplary embodiments, the three cameras other than the cabin interior camera 26—the rear camera 22 and the left and right rear side cameras 24—may be replaced with a 360° camera (for example, a camera that generates a composite image from two fisheye lenses at front and rear) disposed in a protrusion provided on the roof 16B of the vehicle 12. In this case, the imaging angle from the 360° camera may be cropped to imaging angles appropriate to the respective viewing images and the viewing images may be generated.

In the exemplary embodiments, the viewing device for a vehicle 10 is for viewing to the rear of the vehicle 12, but the viewing direction is not limited thus. For example, viewing images may be front images or side images of the vehicle 12. When the viewing images are front images, a plural number of the cameras 20 that image to the front may be provided to serve as the imaging apparatuses and a navigation display or the like may serve as the displayer.

What is claimed is:

1. A viewing device for a vehicle, comprising:
a plurality of imaging apparatuses that differ in imaging range;
an image generation apparatus that, based on images imaged by one or a plurality of the imaging apparatuses, generates a viewing image that is a composite of:
an image to a vehicle rear,
an image of a vehicle structure, the image being semi-transparent, and
an image of a vehicle occupant on a rear seat; and
a displayer that displays the viewing image, wherein
the image generation apparatus generates the viewing image such that a level of transparency of the vehicle structure increases from a vehicle lower side toward a vehicle upper side, and
the closer to the vehicle upper side, the greater the transparency.

2. The viewing device for a vehicle according to claim 1, wherein:
the plurality of imaging apparatuses include:
a rear camera that images rearward from a vehicle rear portion,
a rear side camera that images rearward from a vehicle side portion, and
a cabin interior camera that images rearward in a vehicle cabin, including imaging a rear seat; and
the image generation apparatus composites:
the image to the vehicle rear, in which an image imaged by the rear camera and an image imaged by the rear side camera are composited,
the image of the vehicle structure, which originates from the cabin interior camera, and
the image of the vehicle occupant on the rear seat, which originates from the cabin interior camera.

3. A viewing device for a vehicle, comprising:
a plurality of imaging apparatuses that differ in imaging range;
an image generation apparatus that, based on images imaged by one or a plurality of the imaging apparatuses, generates a viewing image that is a composite of:
an image to a vehicle rear,
an image of a vehicle structure, the image being semi-transparent, and
an image of vehicle occupant on a rear seat; and
a displayer that displays the viewing image, wherein
the vehicle structure includes a pillar,
the image generation apparatus generates the viewing image such that a level of transparency of at least the pillar increases from a vehicle lower side toward a vehicle upper side, and
the closer to the vehicle upper side, the greater the transparency.

* * * * *